(12) United States Patent
Seki et al.

(10) Patent No.: US 10,485,069 B2
(45) Date of Patent: Nov. 19, 2019

(54) ILLUMINATING APPARATUS

(71) Applicant: Panasonic Intellectual Property Management Co., Ltd., Osaka (JP)

(72) Inventors: Keisuke Seki, Osaka (JP); Shigeru Ido, Osaka (JP); Kazuhiko Hayashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/984,389

(22) Filed: May 20, 2018

(65) Prior Publication Data

US 2018/0352627 A1 Dec. 6, 2018

(30) Foreign Application Priority Data

May 30, 2017 (JP) ................ 2017-106812

(51) Int. Cl.
| | |
|---|---|
| H05B 33/08 | (2006.01) |
| G09F 13/22 | (2006.01) |
| G09F 13/00 | (2006.01) |
| G06K 7/14 | (2006.01) |
| G09F 13/02 | (2006.01) |
| H05B 37/02 | (2006.01) |
| F21Y 115/10 | (2016.01) |
| F21V 23/00 | (2015.01) |

(52) U.S. Cl.
CPC ....... *H05B 33/0857* (2013.01); *G06K 7/1473* (2013.01); *G09F 13/005* (2013.01); *G09F 13/02* (2013.01); *G09F 13/22* (2013.01); *H05B 33/0818* (2013.01); *F21V 23/008* (2013.01); *F21Y 2115/10* (2016.08); *H05B 37/0272* (2013.01)

(58) Field of Classification Search
CPC ............ H05B 33/0815; H05B 33/0827; H05B 33/0839; H05B 33/0845; H05B 33/0857; H05B 33/0863
USPC ......................................... 315/186, 192, 193
See application file for complete search history.

(56) References Cited

U.S. PATENT DOCUMENTS

| | | |
|---|---|---|
| 2005/0280375 A1 | 12/2005 | Chikugawa et al. |
| 2006/0202915 A1 | 9/2006 | Chikugawa |
| 2012/0051757 A1 | 3/2012 | Nishio |

(Continued)

FOREIGN PATENT DOCUMENTS

| | | |
|---|---|---|
| JP | 2008-34989 | 2/2008 |
| JP | 2012-69505 | 4/2012 |

(Continued)

OTHER PUBLICATIONS

Non-final Office Action dated Jul. 23, 2019 in corresponding U.S. Appl. No. 16/411,976.

*Primary Examiner* — Tung X Le
(74) *Attorney, Agent, or Firm* — Renner, Otto, Boisselle & Sklar, LLP

(57) ABSTRACT

An illuminating apparatus includes a first light emitter, a second light emitter which emits light including more predefined color components than light emitted by the first light emitter, and a lighting device which supplies current modulated according to a visible light communication signal, to the first light emitter. The lighting device supplies a constant current to the second light emitter, while the first light emitter is supplied with current.

8 Claims, 16 Drawing Sheets

(56) References Cited

U.S. PATENT DOCUMENTS

| | | | |
|---|---|---|---|
| 2012/0286679 A1* | 11/2012 | Liu | H05B 33/0827 |
| | | | 315/193 |
| 2013/0015774 A1* | 1/2013 | Briggs | H05B 33/0815 |
| | | | 315/186 |
| 2013/0057163 A1 | 3/2013 | Sutardja et al. | |
| 2013/0264956 A1* | 10/2013 | Chao | H05B 33/0863 |
| | | | 315/192 |
| 2014/0084802 A1* | 3/2014 | Gruber | H05B 33/0824 |
| | | | 315/201 |
| 2016/0323972 A1 | 11/2016 | Bora et al. | |

FOREIGN PATENT DOCUMENTS

| | | |
|---|---|---|
| JP | 2013-21458 | 1/2013 |
| JP | 2013-26692 | 2/2013 |
| JP | 2014-57195 | 3/2014 |

* cited by examiner

ILLUMINATING APPARATUS

CROSS REFERENCE TO RELATED APPLICATION

This application claims the benefit of priority of Japanese Patent Application Number 2017-106812 filed on May 30, 2017, the entire content of which is hereby incorporated by reference.

BACKGROUND

1. Technical Field

The present disclosure relates to an illuminating apparatus for visible light communication, and a signboard.

2. Description of the Related Art

Visible light communication in which an illuminating apparatus or the like is caused to blink at a high rate that is unrecognizable to human eyes and the bright and dark pattern created by the blinking is used as a data signal has been proposed. Japanese Unexamined Patent Application Publication No. 2012-69505 discloses a circuit used for such visible light communication (or illumination light communication).

SUMMARY

In stores, etc., there are cases where a barcode assigned to a product is read by a barcode reader. When an illuminating apparatus for visible light communication illuminates a space in which such a barcode reader is used, there are instances where an error in reading a barcode occurs.

The present disclosure provides an illuminating apparatus for visible light communication and a signboard, which are capable of inhibiting an error in reading a barcode.

An illuminating apparatus according to an aspect of the present disclosure includes: a first light emitter; a second light emitter which emits light including more predefined color components than light emitted by the first light emitter; and a lighting device which supplies a first current modulated according to a visible light communication signal, to the first light emitter. In the illuminating apparatus, the lighting device supplies, to the second light emitter, one of (a) a constant current and (b) a second current modulated in reverse phase relative to the first current, while the first current is supplied to the first light emitter.

A signboard according to an aspect of the present disclosure includes the above-described illuminating apparatus, and a display panel that is illuminated by the illuminating apparatus and includes at least one of a text character and a graphic.

According to the present disclosure, it is possible to inhibit occurrence of an error in reading a barcode.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments of the present disclosure are described with reference to the Drawings. It should be noted that the embodiments described below each show a general or specific example. Thus, the numerical values, shapes, materials, structural components, the disposition and connection of the structural components, and others described in the following embodiments are mere examples, and do not intend to limit the present disclosure. Furthermore, among the structural components in the following embodiments, structural components not recited in any one of the independent claims are described as arbitrary structural components.

In addition, each of the diagrams is a schematic diagram and thus is not necessarily strictly illustrated. In each of the diagrams, substantially the same structural components are assigned with the same reference signs, and there are instances where redundant descriptions are omitted or simplified.

It should be noted that, in the embodiments, repeating the state in which the illuminating apparatus is turned on and off may be referred to herein as "blink", "blinks", etc., for convenience.

Embodiment 1

(General Configuration)

Figure 1:
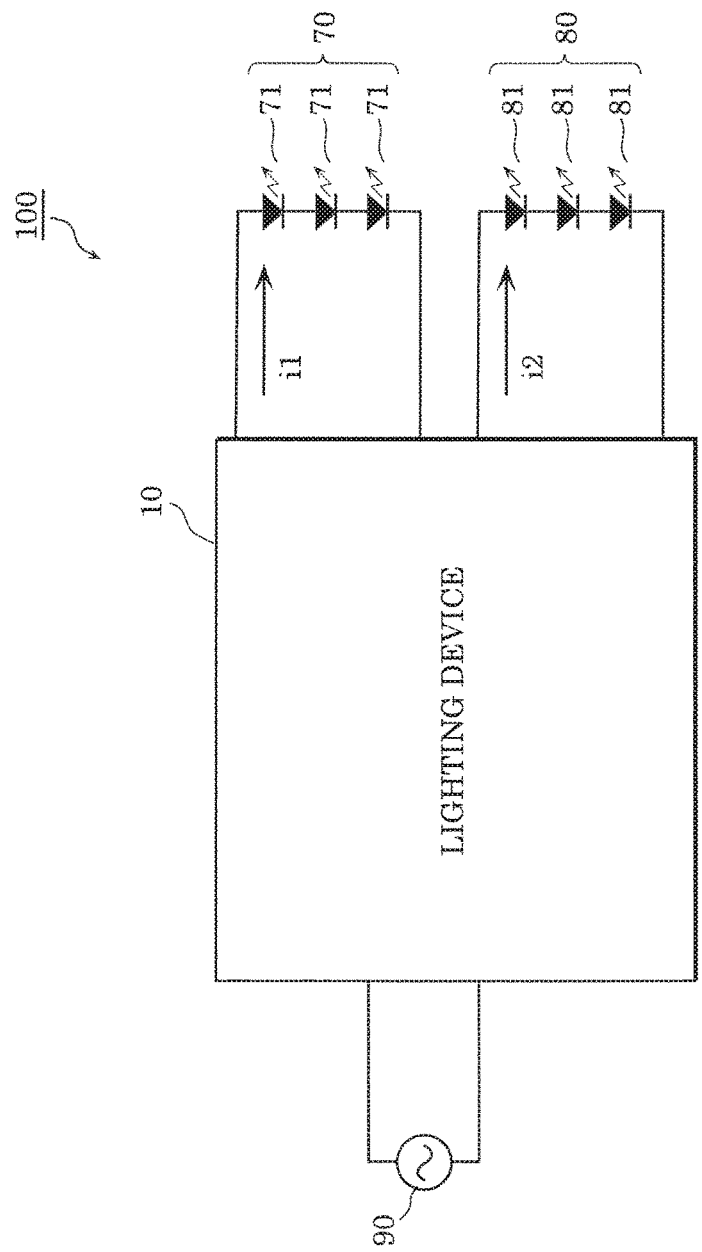
FIG. 1 is a diagram which illustrates a schematic configuration of an illuminating apparatus according to Embodiment 1.

The following describes an illuminating apparatus according to Embodiment 1 with reference to FIG. 1. FIG. 1 is a diagram which illustrates a general configuration of the illuminating apparatus according to Embodiment 1.

Illuminating apparatus 100 illustrated in FIG. 1 includes lighting device 10, first light emitter 70, and second light emitter 80. Illuminating apparatus 100 is an apparatus which illuminates a space with mixed light (or synthetic light) obtained by causing both first light emitter 70 and second light emitter 80 to emit light by lighting device 10. The mixed light is, for example, white light.

In addition, illuminating apparatus 100 is an illuminating apparatus for visible light communication, and an intensity of the above-described mixed light changes at a high rate that is unrecognizable to human eyes according to a visible light communication signal. A mobile terminal such as a smartphone which includes an imaging device is capable of recognizing, as a data signal, brightness or darkness created according to a change in the intensity of mixed light.

Figure 2:
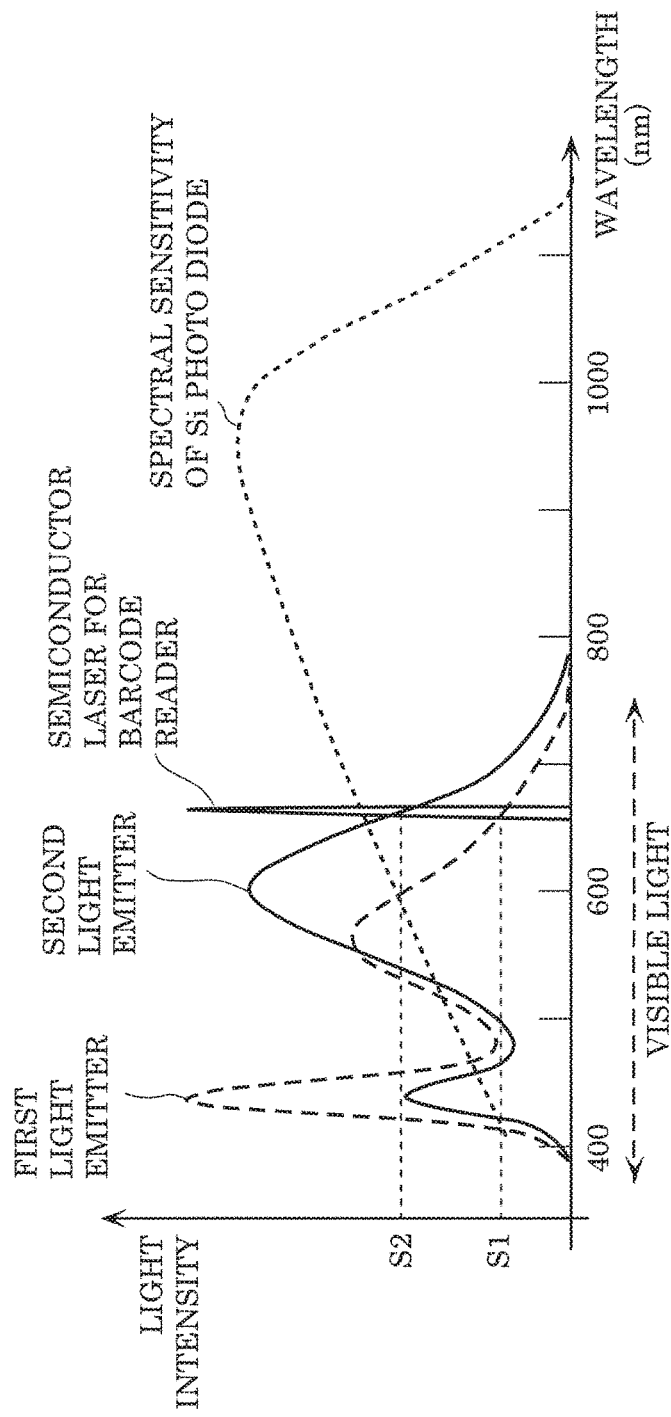
FIG. 2 is a diagram which illustrates emission spectra of a first light emitter and a second light emitter.

Here, first light emitter 70 and second light emitter 80 each emit white light. However, the color temperature of the white light differs. FIG. 2 is a diagram which illustrates emission spectra of first light emitter 70 and second light emitter 80.

As illustrated in FIG. 2, first light emitter 70 emits white light having a color temperature higher than a color temperature of white light emitted by second light emitter 80. The color temperature (a first color temperature) of white light emitted by first light emitter 70 is, for example, 6000 K, and the color temperature (a second color temperature) of white light emitted by second light emitter 80 is, for example, 3000 K. In other words, second light emitter 80 emits light including more red components than light emitted by first light emitter 70.

As described above, light emitted by second light emitter 80 includes more red components than light emitted by first light emitter 70. This means that, for example, when a first emission spectrum of first light emitter 70 which is normalized and a second emission spectrum of second light emitter 80 which are normalized are compared, a light intensity of the second emission spectrum is higher than a light intensity of the first emission spectrum at wavelengths around 650 nm (e.g., wavelengths which belong to the range of from 630 nm to 670 nm, inclusive).

Meanwhile, a barcode reader reads a barcode by, for example, irradiating a barcode with a laser beam which is emitted by a semiconductor laser and has an emission peak wavelength at a wavelength around 650 nm, and receiving information indicating brightness or darkness of reflection light from the barcode by an Si photo diode. FIG. 2 also illustrates an emission spectrum of the semiconductor laser for a barcode reader and a spectral sensitivity of an Si photo diode. The Si photo diode has a spectral sensitivity at a wavelength shorter than 1100 nm which corresponds to a band gap. The spectral sensitivity of the Si photo diode has a peak in a range from 900 nm to 1100 nm, and the spectral sensitivity is lowered with decreasing wavelength.

Lighting device 10 included in illuminating apparatus 100 supplies current i1 which is modulated according to a visible light communication signal, to first light emitter 70. As a result, first light emitter 70 blinks according to the visible light communication signal. In addition, lighting device 10 supplies current i2, which is a constant current, to second light emitter 80 while first light emitter 70 is supplied with current i1. It should be noted that, here, constant current i2 is not strictly meaning a constant current, but means a substantially constant current (current that is substantially constant) which lighting device 10 supplies to second light emitter 80 with the intention of constant current driving. The above-described constant current i2 may slightly change due to on or off of first switching element 33 which will be described later, a power supply noise, etc.

Figure 3:
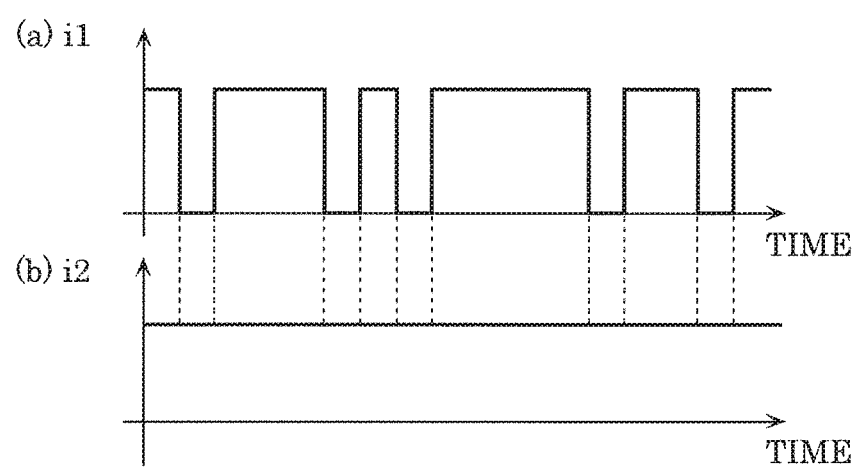
FIG. 3 is a diagram which illustrates current supplied to the first light emitter and current supplied to the second light emitter according to Embodiment 1.

As a result of being supplied with constant current i2 by lighting device 10, second light emitter 80 continues to emit light at a constant brightness level while first light emitter 70 is supplied with current i1. FIG. 3 is a diagram which illustrates current i1 ((a) in FIG. 3) supplied to first light emitter 70 and current i2 ((b) in FIG. 3) supplied to second light emitter 80.

According to this diagram, the intensity of mixed light of light emitted by first light emitter 70 and light emitted by second light emitter 80, which is emitted from illuminating apparatus 100, changes according to a visible light communication signal; however, second light emitter 80, which emits light having a relatively large number of red components, emits light at a constant brightness level. For that reason, a modulation degree of light (a difference between brightness and darkness of light) decreases in a red wavelength band (a wave length band around 650 nm). Accordingly, the barcode reader which reads brightness or darkness of light of reflection light in the red wavelength band is less influenced by a change in the intensity of mixed light emitted by illuminating apparatus 100. In other words, illuminating apparatus 100 is capable of inhibiting occurrence of an error in reading a barcode. The following describes the detail of each of the structural components included in illuminating apparatus 100.

(First Light Emitter and Second Light Emitter)

First, first light emitter 70 and second light emitter 80 will be described. First light emitter 70 is a light emitting module which functions as a light source of illuminating apparatus 100, and emits, for example, white light having the first color temperature. First light emitter 70 includes a plurality of first light emitting elements 71; however, at least one first light emitting element 71 may be sufficient to be included by first light emitter 70.

First light emitter 70 is a light emitting module having, for example, a surface mount device (SMD) structure. In this case, each of the plurality of first light emitting elements 71 is an SMD LED element which emits while light having the first color temperature. First light emitter 70 may be a light emitting module having a chip on board (COB) structure. In this case, each of the plurality of first light emitting elements 71 is, for example, an LED chip which emits blue light, and is sealed by a sealing resin including a yellow or green phosphor.

In FIG. 1, although the plurality of first light emitting elements 71 are connected in series, the plurality of first light emitting elements 71 may be electrically connected in any manner. First light emitter 70 may have a configuration in which, for example, a plurality of sets of first light emitting elements 71 connected in series are connected in parallel.

Second light emitter 80 is a light emitting module which functions as a light source of illuminating apparatus 100, and emits, for example, white light having a second color temperature lower than the first color temperature. Second light emitter 80 includes a plurality of second light emitting elements 81; however, at least one second light emitting element 81 may be sufficient to be included by second light emitter 80. It should be noted that it is sufficient that the second color temperature is significantly lower than the first color temperature. For example, it is sufficient that the second color temperature is lower than the first color temperature by at least 1000 K.

Second light emitter 80 is, for example, an SMD light emitting module. In this case, second light emitting element 81 is an SMD LED element which emits white light having the second color temperature. Second light emitter 80 may be a light emitting module having a chip on board (COB) structure. In this case, second light emitting element 81 is, for example, an LED chip which emits blue light, and is sealed by a sealing resin including a yellow or green phosphor.

Although the plurality of second light emitting elements 81 are connected in series in FIG. 1, the plurality of second light emitting elements 81 may be electrically connected in any manner. Second light emitter 80 may have a configuration in which, for example, a plurality of sets of second light emitting elements 81 connected in series are connected in parallel.

It should be noted that first light emitting elements 71 and second light emitting elements 81 may each be other light emitting element such as an organic EL element, an inorganic EL element, a semiconductor laser, etc.

(Lighting Device)

Figure 4:
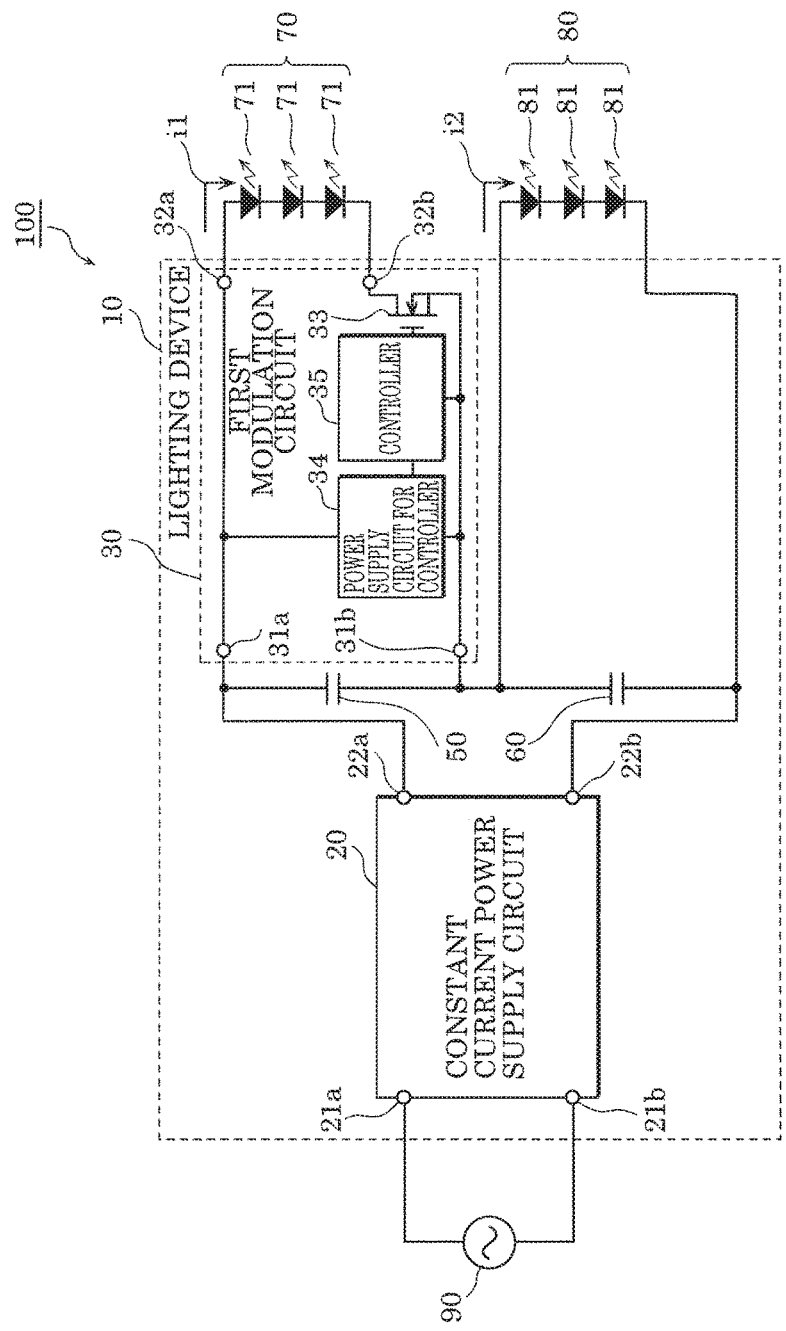
FIG. 4 is a diagram which illustrates a detailed configuration of the illuminating apparatus according to Embodiment 1.

Next, lighting device 10 will be described. FIG. 4 is a diagram which illustrates a detailed configuration of illuminating apparatus 100 and lighting device 10 according to Embodiment 1. As illustrated in FIG. 4, lighting device 10 includes constant current power supply circuit 20, first modulation circuit 30, first capacitor 50, and second capacitor 60.

Constant current power supply circuit 20 includes input terminal 21a, input terminal 21b, output terminal 22a, and output terminal 22b. Constant current power supply circuit 20 converts AC power supplied from power system 90 via input terminal 21a and input terminal 21b into DC power, and outputs substantially constant DC current via output terminal 22a and output terminal 22b. A specific circuit configuration of constant current power supply circuit 20 will be described later.

First modulation circuit 30 modulates current supplied from constant current power supply circuit 20 or first capacitor 50, according to a visible light communication signal, and supplies the current to first light emitter 70. First modulation circuit 30 includes, specifically, input terminal 31a, input terminal 31b, output terminal 32a, output terminal 32b, first switching element 33, power supply circuit for controller 34, and controller 35. The plurality of first light emitting elements 71 are electrically connected between output terminal 32a and output terminal 32b. As described above, the plurality of first light emitting elements 71 are connected in series. In addition, first capacitor 50 is inserted between input terminal 31a and input terminal 31b. First capacitor 50 may or may not be included in first modulation circuit 30.

First switching element 33 is connected in series to first light emitter 70, and switched by controller 35 according to a first visible light communication signal. First switching element 33 is, for example, a field effect transistor (FET).

Power supply circuit for controller 34 is a circuit which generates, from an output voltage of constant current power supply circuit 20, a power supply voltage for causing controller 35 to operate. Power supply circuit for controller 34 is, for example, a small switching regulator, a series regulator, or the like which outputs a constant voltage.

Controller 35 obtains a visible light communication signal from inside or outside of controller 35, and performs control of switching first switching element 33 according to the obtained first visible light communication signal. As a result, first light emitter 70 blinks according to the visible light communication signal.

Controller 35 is, specifically, a microcomputer which is operated by the power supply voltage generated by power supply circuit for controller 34. Controller 35 is, for example, a large scale integration (LSI) including a read only memory (ROM) which stores a program, a random access memory (RAM) as a temporal storage area, a processor which executes a program, input/output circuits such as an A/D converter and a D/A converter, a counter/timer, etc. Controller 35, for example, turns on or off first switching element 33 according to a built-in program.

First capacitor 50 is inserted between input terminal 31a and input terminal 31b. In other words, first capacitor 50 is connected to first modulation circuit 30 in parallel. First capacitor 50 is, for example, an electrolytic capacitor. First capacitor 50 serves as a current path to second light emitter 80 when first switching element 33 is off. First capacitor 50 may be formed using a capacitor having a relatively large capacitance.

Second capacitor 60 is connected to second light emitter 80 in parallel. Second capacitor 60 is, for example, an electrolytic capacitor. Electric charges for continuing current supply to second light emitter 80 when first switching element 33 is off are accumulated in second capacitor 60. It should be noted that lighting device 10 need not necessarily include second capacitor 60.

(Specific Configuration of Constant Current Power Supply Circuit)

Figure 5:
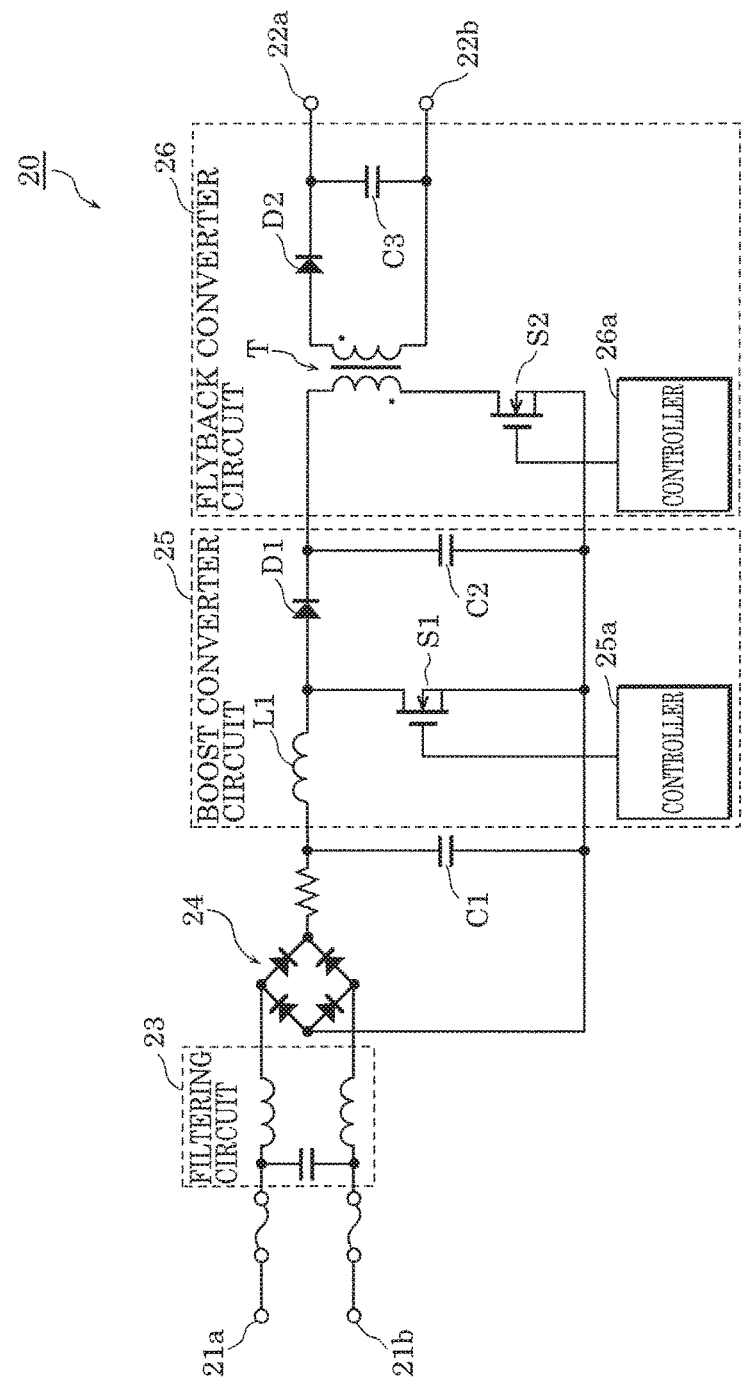
FIG. 5 is a diagram which illustrates an example of a specific circuit configuration of a constant current power supply circuit.

Next, a specific circuit configuration of constant current power supply circuit 20 will be described. FIG. 5 is a diagram which illustrates an example of a specific circuit configuration of constant current power supply circuit 20.

As illustrated in FIG. 5, constant current power supply circuit 20 mainly includes filtering circuit 23, rectifier circuit 24, capacitor C1, boost converter circuit 25, and flyback converter circuit 26.

Filtering circuit 23 is a circuit which reduces noise included in AC power supplied from power system 90 and noise generated in converter and outflowing to power system 90. Filtering circuit 23 is formed using, for example, an inductor and a capacitor.

Rectifier circuit 24 is a circuit which converts AC power whose noise is reduced by filtering circuit 23, into DC power. Rectifier circuit 24 is, specifically, a full-wave rectifier circuit formed using a diode bridge.

Boost converter circuit 25 is a circuit which performs a power factor correction control. Boost converter circuit 25 includes choke coil L1, switching element S1, diode D1, smoothing capacitor C2, and controller 25a.

Controller 25a is a control circuit (e.g., a control IC) which performs switching control on switching element S1 at a high rate. Switching element Si is, for example, an FET.

When switching element S1 is turned on by controller 25a, energy is accumulated in choke coil L1. When switch element S1 is turned off, choke coil L1 releases energy so as to maintain current at a level when switch element S1 is on. As a result, a DC voltage is output via diode D1. The output DC voltage is smoothed by smoothing capacitor C2. Smoothing capacitor C2 is, for example, an electrolytic capacitor.

Flyback converter circuit 26 is a circuit which converts the substantially constant DC voltage output from boost converter circuit 25 into a substantially constant current. Flyback converter circuit 26 includes trans T, switching element S2, diode D2, smoothing capacitor C3, and controller 26a.

Controller 26a is a control circuit (e.g., a control IC) which performs switching control at a high rate (repeating turning on and off) on switching element S2. Switching element S2 is, for example, an FET. When switching element S2 is switched by controller 26a, energy is transmitted from a primary coil to a secondary coil of trans T by electromagnetic induction, and current flows through the secondary coil. This current is rectified by diode D2 and smoothed by smoothing capacitor C3. Smoothing capacitor C3, stated differently, reduces a ripple current. Smoothing capacitor C3 is, for example, an electrolytic capacitor, and connected between output terminal 22a and output terminal 22b.

It should be noted that controller 26a monitors current flowing though the primary coil or current flowing through the secondary coil, and performs control of changing a switching frequency or a duty ratio such that the monitored current becomes substantially constant. When monitoring current flowing through the secondary coil, an insulating element such as a photocoupler is used.

Here, the switching frequency (operation frequency of flyback converter circuit 26) of controller 26a may be higher than a frequency corresponding to a bit rate of a visible light communication signal (e.g., approximately from several kHz to several MHz). In this manner, electrical impedance of smoothing capacitor C3 to a ripple current decreases, and thus the ripple current is easily reduced by smoothing capacitor C3.

It should be noted that, in lighting device 10, first capacitor 50 and second capacitor 60 perform similar functions as smooth capacitor C3. Accordingly, constant current power supply circuit 20 need not necessarily include smoothing capacitor C3 between the output terminals. Omission of smoothing capacitor C3 realizes reduction of the number of components of lighting device 10.

(Variation of Lighting Device)

Figure 6:
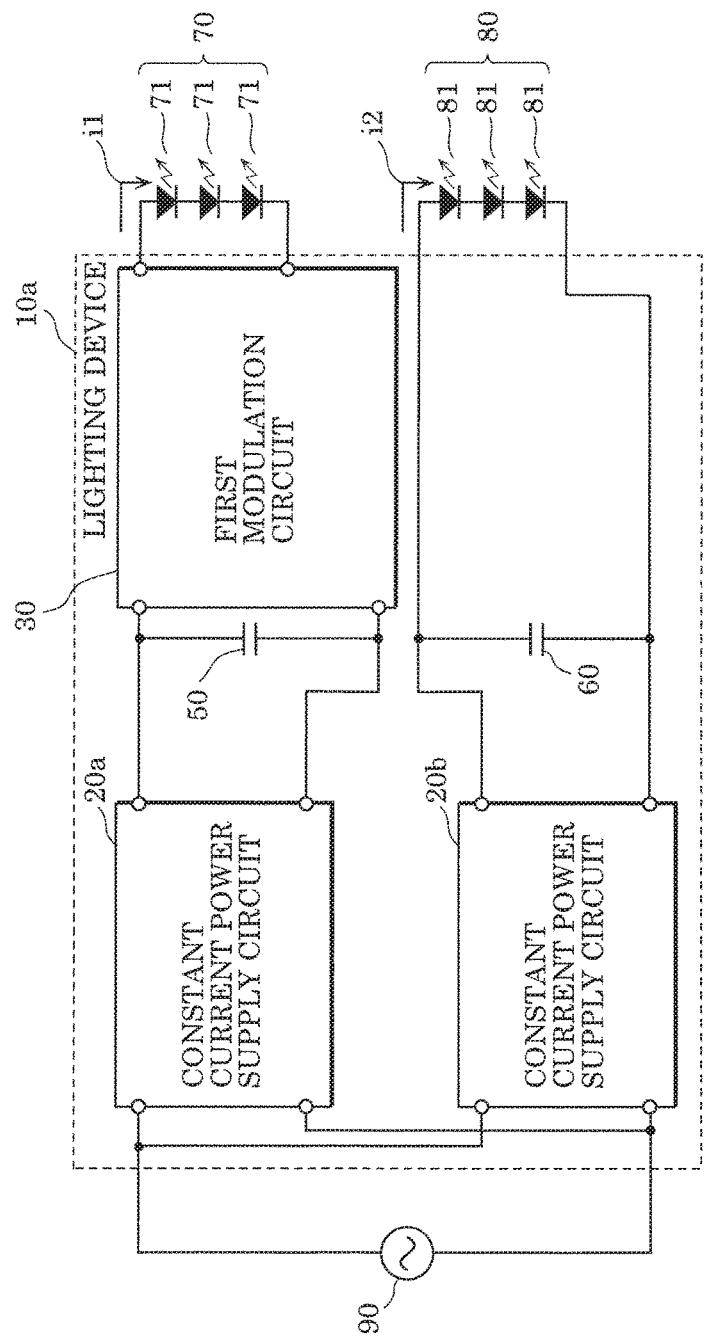
FIG. 6 is a diagram which illustrates a configuration of a lighting device that includes two constant current power supply circuits, according to Embodiment 1.

The above-described configuration of lighting device 10 is one example. For example, first modulation circuit 30 may have a different circuit configuration. In addition, constant current power supply circuit 20 may have a different circuit configuration as long as constant current power supply circuit 20 is a power supply circuit that functions as a constant current source. In addition, lighting device 10 may include two constant current power supply circuits 20. FIG. 6 is a diagram which illustrates a configuration of a lighting device that includes two constant current power supply circuits 20.

Lighting device 10a illustrated in FIG. 6 includes constant current power supply circuit 20a which supplies a constant current to first modulation circuit 30 for causing first light emitter 70 to emit light, and constant current power supply circuit 20b which supplies constant current i2 to second light emitter 80 for causing second light emitter 80 to emit light. Each of constant current power supply circuit 20a and constant current power supply circuit 20b has, for example, a configuration same as or similar to the configuration of constant current power supply circuit 20.

Such lighting device 10a is capable of more stably supplying current to second light emitter 80 than lighting device 10. It should be noted that lighting device 10a need not necessarily include first capacitor 50 and second capacitor 60.

(Variations of First Light Emitter and Second Light Emitter)

Figure 7:
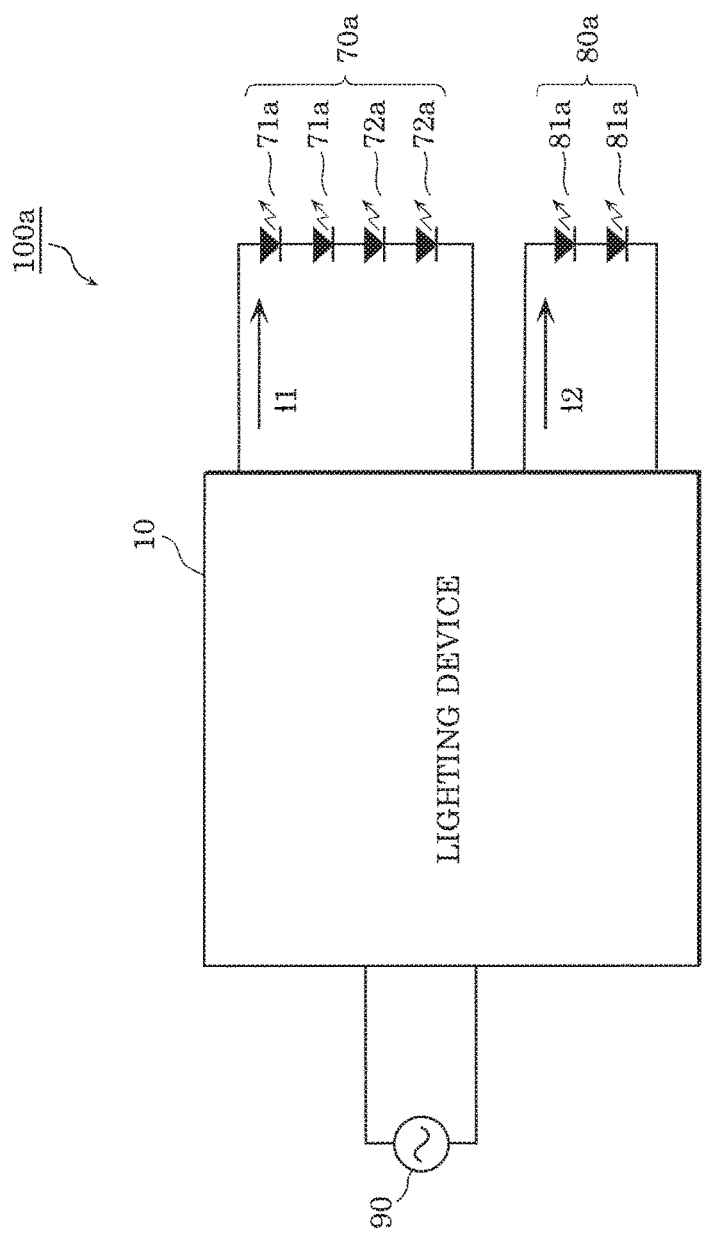
FIG. 7 is a diagram which illustrates a schematic configuration of an illuminating apparatus according to a variation example of Embodiment 1.
Figure 8:
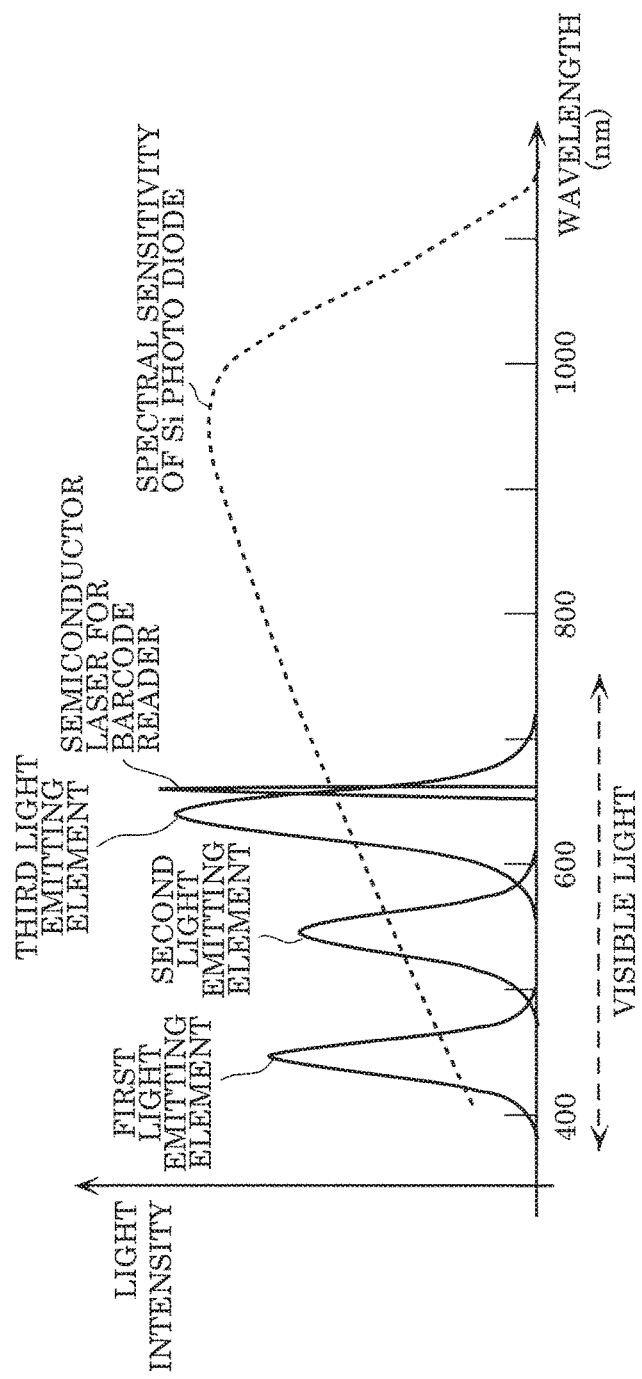
FIG. 8 is a diagram which illustrates emission spectra of a first light emitting element which emits blue light, a second light emitting element which emits green light, and a third light emitting element which emits red light.

Illuminating apparatus 100 may emit white light on the whole. Illuminating apparatus 100 may emit white light by, for example, a combination of a first light emitting element which emits blue light, a second light emitting element which emits green light, and a third light emitting element which emits red light. FIG. 7 is a diagram which illustrates a general configuration of such an illuminating apparatus according to a variation example of Embodiment 1. FIG. 8 is a diagram which illustrates emission spectra of a first light emitting element which emits blue light, a second light emitting element which emits green light, and a third light emitting element which emits red light.

Illuminating apparatus 100a illustrated in FIG. 7 includes lighting device 10, first light emitter 70a, and second light emitter 80a. Illuminating apparatus 100a may include lighting device 10a instead of lighting device 10.

First light emitter 70a includes first light emitting element 71a which emits blue light and second light emitting element 72a which emits green light. Each of first light emitting element 71a and second light emitting element 72a is, for example, an LED chip, however, may be a different light emitting element such as an organic EL element. Blue light is, for example, monochromatic light having an emission peak wavelength at 450 nm or greater and 495 nm or less, and green light is, for example, monochromatic light having an emission peak wavelength at 495 nm or greater and 570 nm or less. It should be noted that although first light emitter 70a does not include third light emitting element 81a which emits red light, first light emitter 70a may include a small number of third light emitting element 81a.

In contrast, second light emitter 80a includes third light emitting element 81a which emits red light. Third light emitting element 81a is, for example, an LED chip, however, may be a different light emitting element such as an organic EL element. Red light is, for example, monochromatic light having an emission peak wavelength at 620 nm or greater and 750 nm or less. Second light emitter 80a as described above emits light including more red components than light emitted by first light emitter 70a. It should be noted that although second light emitter 80a does not include first light emitting element 71a and second light emitting element 72a, and emits monochromatic light of red, second light emitter 80a may include a small number of first light emitting element 71a, or a small number of second light emitting element 72a.

In illuminating apparatus 100a as well, lighting device 10 supplies current i1 which is modulated according to a visible light communication signal to first light emitter 70a, and supplies current i2 which is a constant current to second light emitter 80a while first light emitter 70a is supplied with current i1. First light emitter 70a blinks while being supplied with current i1, and second light emitter 80a continues to emit light at a constant brightness level while first light emitter 70a is supplied with current i1.

Mixed light of light from first light emitter 70a and light from second light emitter 80a, which is emitted by illuminating apparatus 100a, is white light. Although the intensity of the white light changes according to a visible light communication signal, since second light emitter 80a which emits red light emits light at a constant brightness level, a modulation degree of light (i.e., a difference between brightness and darkness of light) decreases in a red wavelength band (i.e., a wavelength band around 650 nm). The modulation degree of light in the red wavelength band becomes nearly zero. Accordingly, the barcode reader which reads brightness or darkness of reflection light in the red wavelength band is less influenced by a change in the intensity of white light emitted by illuminating apparatus 100a. In other words, illuminating apparatus 100a is capable of inhibiting occurrence of an error in reading a barcode.

(Casing)

Figure 9:
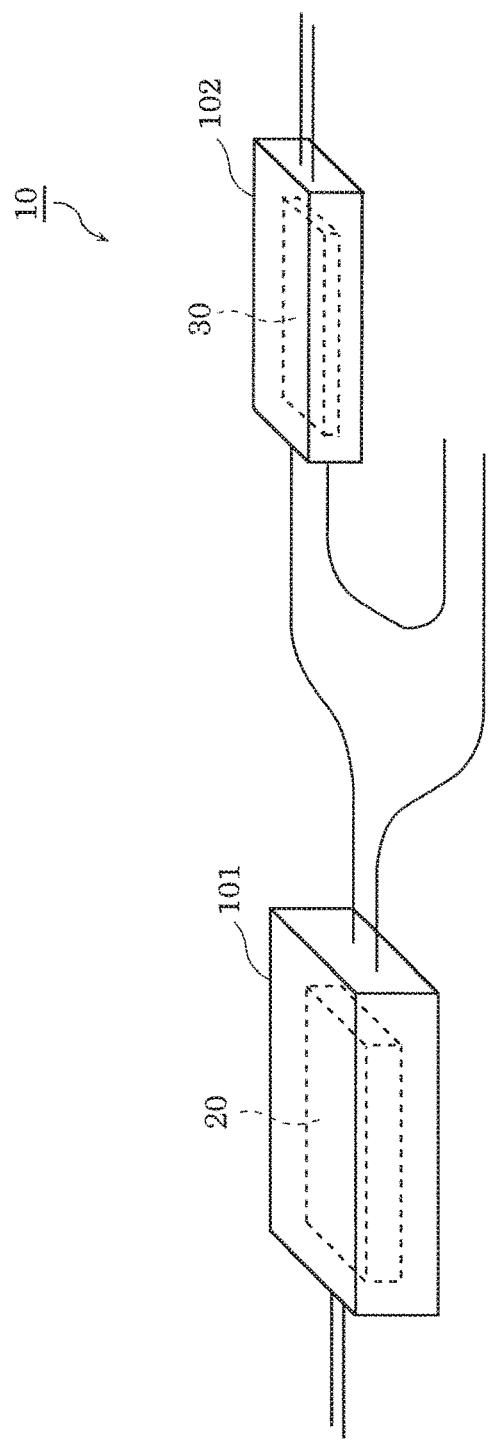
FIG. 9 is a diagram which illustrates an external appearance of the lighting device when the constant current power supply circuit and a first modulation circuit are separately housed in different casings.

Lighting device 10 may include a casing. Lighting device 10 may include a single casing which houses constant current power supply circuit 20 and first modulation circuit 30. Alternatively, constant current power supply circuit 20 and first modulation circuit 30 may be housed separately in different casings. FIG. 9 is a diagram which illustrates an external appearance of lighting device 10 when constant current power supply circuit 20 and first modulation circuit 30 are separately housed in different casings.

In the example of FIG. 9, lighting device 10 includes casing 101 which houses constant current power supply circuit 20 and casing 102 which houses first modulation circuit 30. Casing 101 and casing 102 are each formed using a metal material such as aluminum, for example. However, casing 101 and casing 102 may be each formed using a resin material such as a polybutylene terephthalate resin.

As described above, by separately housing constant current power supply circuit 20 and first modulation circuit 30 into different casings, it is possible to facilitate attaching and detaching of first modulation circuit 30 to and from constant current power supply circuit 20.

Figure 10:
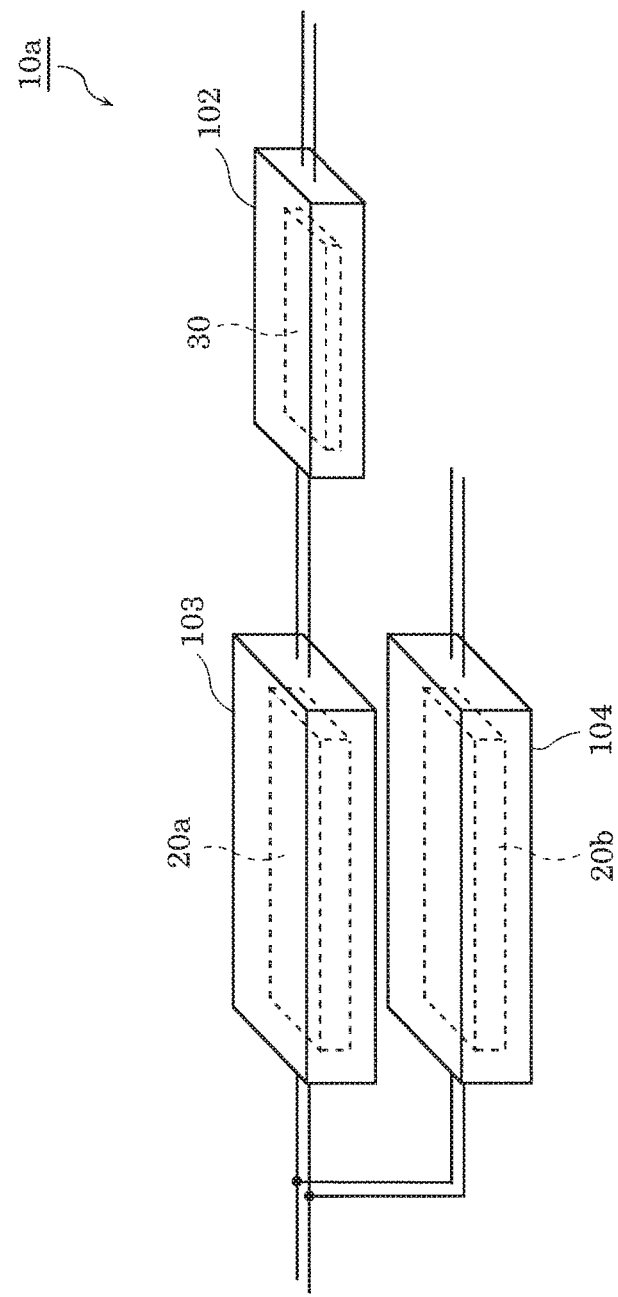
FIG. 10 is a diagram which illustrates an external appearance of the lighting device when the two constant current power supply circuits and the first modulation circuit are separately housed in different casings.

In the same manner as above, lighting device 10a may include a casing. Lighting device 10a may include a single casing which houses constant current power supply circuit 20a, constant current power supply circuit 20b, and first modulation circuit 30. Alternatively, constant current power supply circuit 20a, constant current power supply circuit 20b, and first modulation circuit 30 may be housed separately in different casings. FIG. 10 is a diagram which illustrates an external appearance of lighting device 10a when constant current power supply circuit 20a, constant current power supply circuit 20b, and first modulation circuit 30 are separately housed in different casings.

In the example of FIG. 10, lighting device 10a includes casing 103 which houses constant current power supply circuit 20a, casing 104 which houses constant current power supply circuit 20b, and casing 102 which houses first modulation circuit 30. Casing 102, casing 103, and casing 104 are each formed using a metal material such as aluminum, for example. However, casing 102, casing 103, and casing 104 may be each formed using a resin material such as a polybutylene terephthalate resin.

As described above, by separately housing constant current power supply circuit 20a, constant current power supply circuit 20b, and first modulation circuit 30 into different casings, it is possible to facilitate attaching and detaching of constant current power supply circuit 20a, constant current power supply circuit 20b, and first modulation circuit 30.

Embodiment 2

(Configuration of Illuminating Apparatus According to Embodiment 2)

Figure 11:
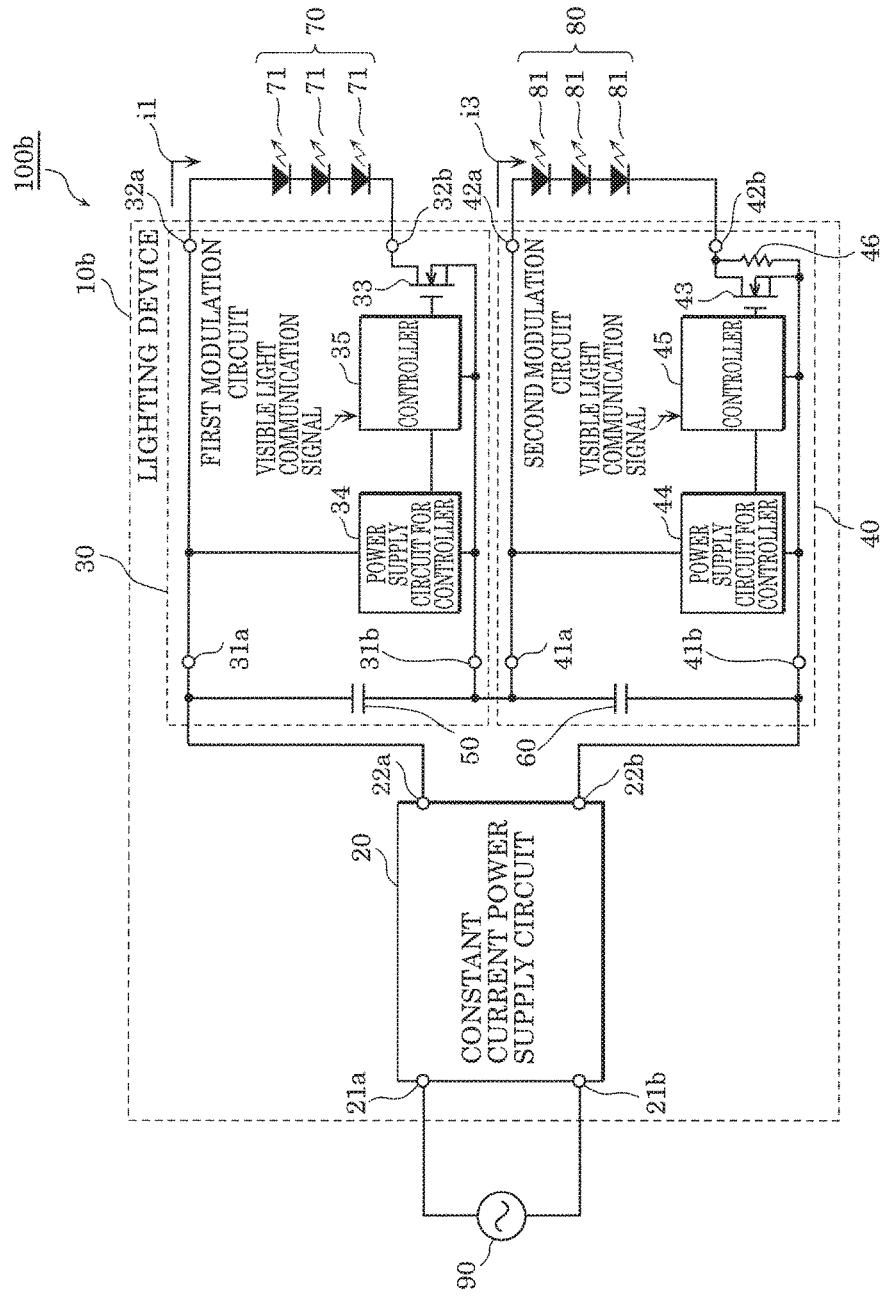
FIG. 11 is a diagram which illustrates a detailed configuration of an illuminating apparatus according to Embodiment 2.

In Embodiment 1, lighting device 10 or lighting device 10a supplies current i2, which is a constant current, to second light emitter 80, while first light emitter 70 is supplied with current i1. However, lighting device 10 may supply current i3 which is modulated in reverse phase relative to current i1, to second light emitter 80, while first light emitter 70 is supplied with current i1. The following describes an illuminating apparatus according to Embodiment 2 which include the above-described lighting device. FIG. 11 is a diagram which illustrates a detailed configuration of an illuminating apparatus according to Embodiment 2. It should be noted that, in Embodiment 2 below, the difference from Embodiment 1 will be mainly described, and description for the matters that have already been described will be omitted.

As illustrated in FIG. 11, illuminating apparatus 100b includes lighting device 10b, first light emitter 70, and second light emitter 80. Lighting device 10b includes constant current power supply circuit 20, first modulation circuit 30, second modulation circuit 40, first capacitor 50, and second capacitor 60. It should be noted that, although first capacitor 50 is included in first modulation circuit 30 in FIG. 11, first capacitor 50 may or may not be included in first modulation circuit 30. Likewise, although second capacitor 60 is included in second modulation circuit 40 in FIG. 11, second capacitor 60 may or may not be included in second modulation circuit 40. Lighting device 10b is different from lighting device 10 in that lighting device 10b further includes second modulation circuit 40.

In lighting device 10b, first modulation circuit 30 and second modulation circuit 40 are connected in series between output terminal 22a and output terminal 22b of constant current power supply circuit 20. More specifically, output terminal 22a of constant current power supply circuit 20 and input terminal 31a of first modulation circuit 30 are electrically connected, input terminal 31b of first modulation circuit 30 and input terminal 41a of second modulation circuit 40 are electrically connected, and input terminal 41b of second modulation circuit 40 and output terminal 22b of constant current power supply circuit 20 are electrically connected.

With this configuration, lighting device 10b is capable of supplying current on which different modulation has been performed, separately to first light emitter 70 and second light emitter 80, by a single constant current power supply circuit 20.

First capacitor 50 is connected to first modulation circuit 30 in parallel. Electric charges for continuing current supply to second light emitter 70 when second switching element 43 of second modulation circuit 40 is off are accumulated in first capacitor 50. In the same manner as above, second capacitor 60 is connected to second modulation circuit 40 in parallel. Electric charges for continuing current supply to second light emitter 80 when first switching element 33 is off are accumulated in second capacitor 60.

Second modulation circuit 40 includes, specifically, input terminal 41a, input terminal 41b, output terminal 42a, output terminal 42b, second switching element 43, power supply circuit for controller 44, controller 45, and resistive element 46. A plurality of second light emitting elements 81 are electrically connected between output terminal 42a and output terminal 42b. As described above, the plurality of second light emitting elements 81 are connected in series.

Figure 12:
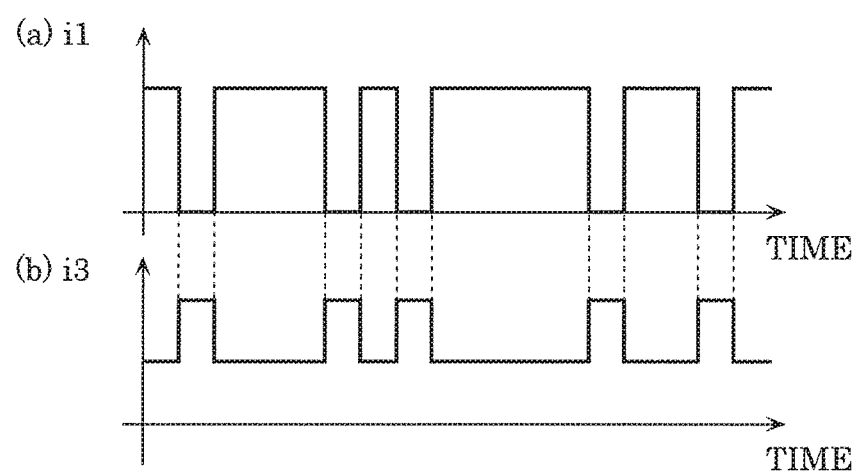
FIG. 12 is a diagram which illustrates current supplied to a first light emitter and current supplied to a second light emitter according to Embodiment 2.

Although second modulation circuit 40 has substantially the same configuration as the configuration of first modulation circuit 30, second modulation circuit 40 supplies, to second light emitter 80, current i3 that is obtained by modulating current supplied from constant current power supply circuit 20 or second capacitor 60 in reverse phase relative to current i1. FIG. 12 is a diagram which illustrates current i1 ((a) in FIG. 12) supplied to first light emitter 70 and current i3 ((b) in FIG. 12) supplied to second light emitter 80.

As illustrated in FIG. 12, current i1 is in reverse phase relative to current i3. More specifically, current i3 is at a low level during a period in which current i1 is at a high level, and current i3 is at a high level during a period in which current i1 is at a low level. In other words, emission intensity of second light emitter 80 changes in reverse phase relative to emission intensity of first light emitter 70 while first light emitter 70 is supplied with current i1.

With this, although the intensity of light emitted by illuminating apparatus 100b changes, on the whole, according to a visible light communication signal, a modulation degree of light (a difference between brightness and darkness of light) decreases at a red wavelength band (a wavelength band around 650 nm). Accordingly, the barcode reader which reads brightness or darkness of reflection light in the red wavelength band is less influenced by a change in the intensity of light emitted by illuminating apparatus 100b. In other words, illuminating apparatus 100a is capable of inhibiting occurrence of an error in reading a barcode.

For example, the modulation degree of light emitted by first light emitter 70 is denoted as a1, the modulation degree of light emitted by second light emitter 80 is denoted as a2, a light intensity of the emission peak wavelength (hereinafter referred to also as a subject wavelength) of semiconductor laser for a barcode reader in the emission spectrum of first light emitter 70 is denoted as S1, and a light intensity of a subject wavelength in the emission spectrum of second light emitter 80 is denoted as S2. S1 and S2 are indicated in the above-described FIG. 2. In this case, when a1:a2=S2:S1, the modulation degree of light of the subject wavelength is 0. In other words, the intensity of light emitted by illuminating apparatus 100b changes, on the whole, according to a visible light communication signal, but the brightness level of light of a subject wavelength is substantially constant.

It should be noted that, in second modulation circuit 40, resistive element 46 is connected in parallel with second switching element 43. Accordingly, second light emitter 80 emits light even when second switching element 43 is off. In other words, second light emitter 80 continues to emit light while first light emitter 70 is supplied with current i1. However, second modulation circuit 40 need not include resistive element 46. Second light emitter 80 is capable of emitting light equivalently if a gate voltage of second switching element 43 is controlled and thus current that is at a certain level passes through second switching element 43 even when a gate voltage is at a low level. In addition, second light emitter 80 may blink while first light emitter 70 is supplied with current i1.

Variation of Embodiment 2

Figure 13:
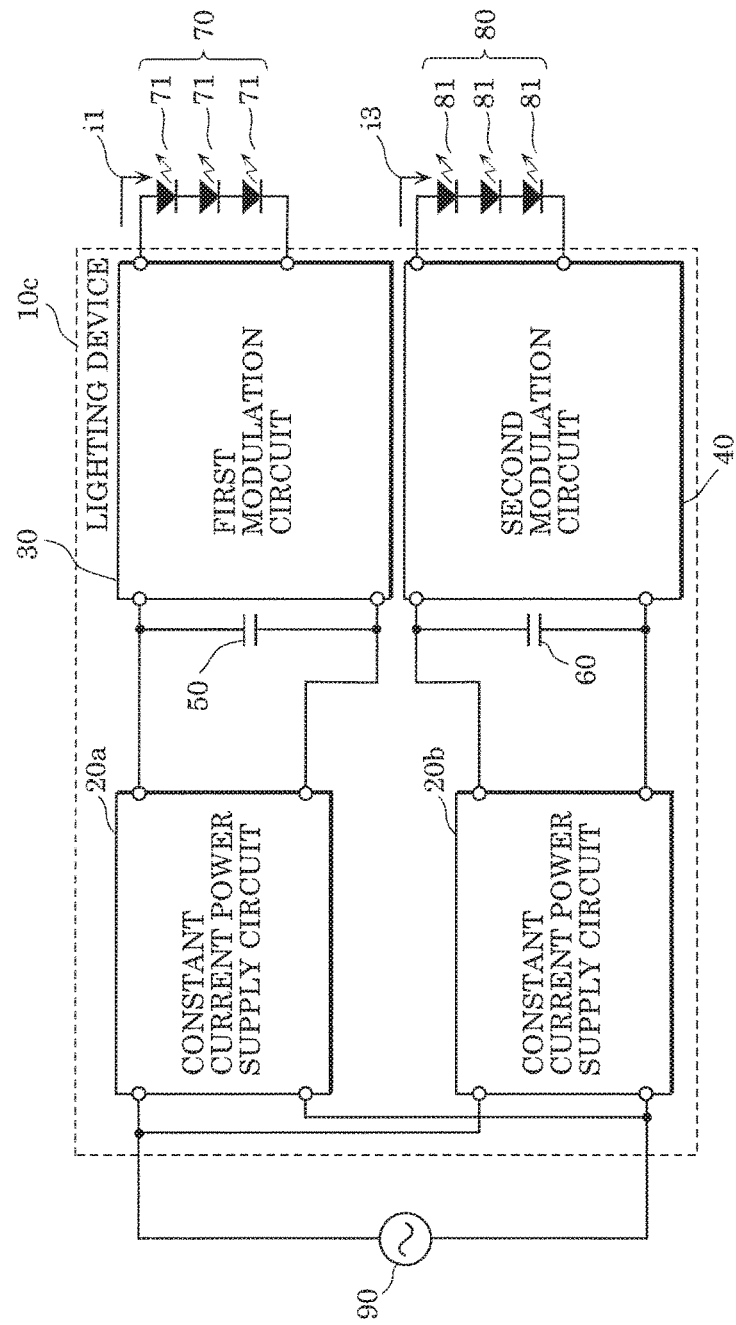
FIG. 13 is a diagram which illustrates a configuration of a lighting device that includes two constant current power supply circuits, according to Embodiment 2.

Lighting device 10b may include two constant current power supply circuits 20. FIG. 13 is a diagram which illustrates a configuration of a lighting device that includes two constant current power supply circuits.

Lighting device 10c illustrated in FIG. 13 includes constant current power supply circuit 20a which supplies a constant current to first modulation circuit 30 for causing first light emitter 70 to emit light, and constant current power supply circuit 20b which supplies current to second light emitter 80 for causing second light emitter 80 to emit light. Each of constant current power supply circuit 20a and constant current power supply circuit 20b has, for example, a configuration same as or similar to constant current power supply circuit 20.

Lighting device 10c as described above is capable of more stably supplying current to first light emitter 70 and second light emitter 80 than lighting device 10b.

Figure 14:
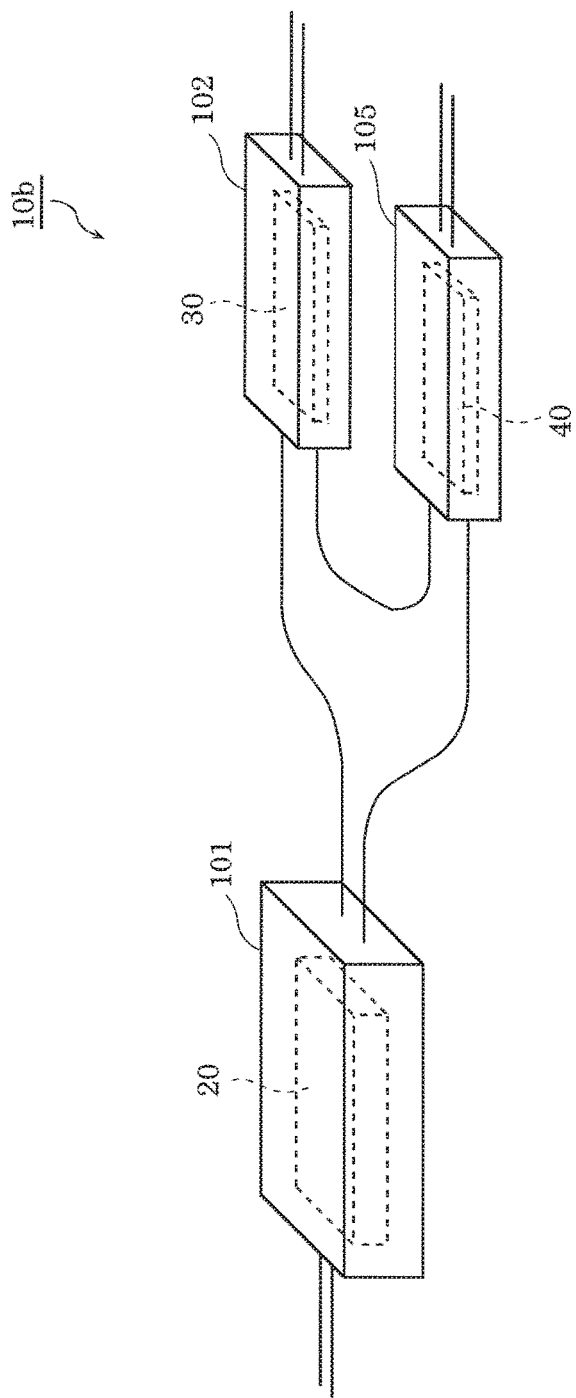
FIG. 14 is a diagram which illustrates an external appearance of the lighting device when the constant current power supply circuit, the first modulation circuit, and the second modulation circuit are separately housed in different casings.

In addition, lighting device 10b may include a casing. Lighting device 10b may include a single casing which houses constant current power supply circuit 20, first modulation circuit 30, and second modulation circuit 40. Alternatively, constant current power supply circuit 20, first modulation circuit 30, and second modulation circuit 40 may be housed separately in different casings. FIG. 14 is a diagram which illustrates an external appearance of lighting device 10b when constant current power supply circuit 20, first modulation circuit 30, and second modulation circuit 40 are separately housed in different casings.

In the example of FIG. 14, lighting device 10 includes casing 101 which houses constant current power supply circuit 20, casing 102 which houses first modulation circuit 30, and casing 105 which houses second modulation circuit 40. Casing 101, casing 102, and casing 105 are each formed using a metal material such as aluminum, for example. However, casing 101, casing 102, and casing 105 may be each formed using a resin material such as a polybutylene terephthalate resin.

As described above, by separately housing constant current power supply circuit 20, first modulation circuit 30, and second modulation circuit 40 into different casings, it is possible to facilitate attaching and detaching of first modulation circuit 30 and second modulation circuit 40 to and from constant current power supply circuit 20.

Figure 15:
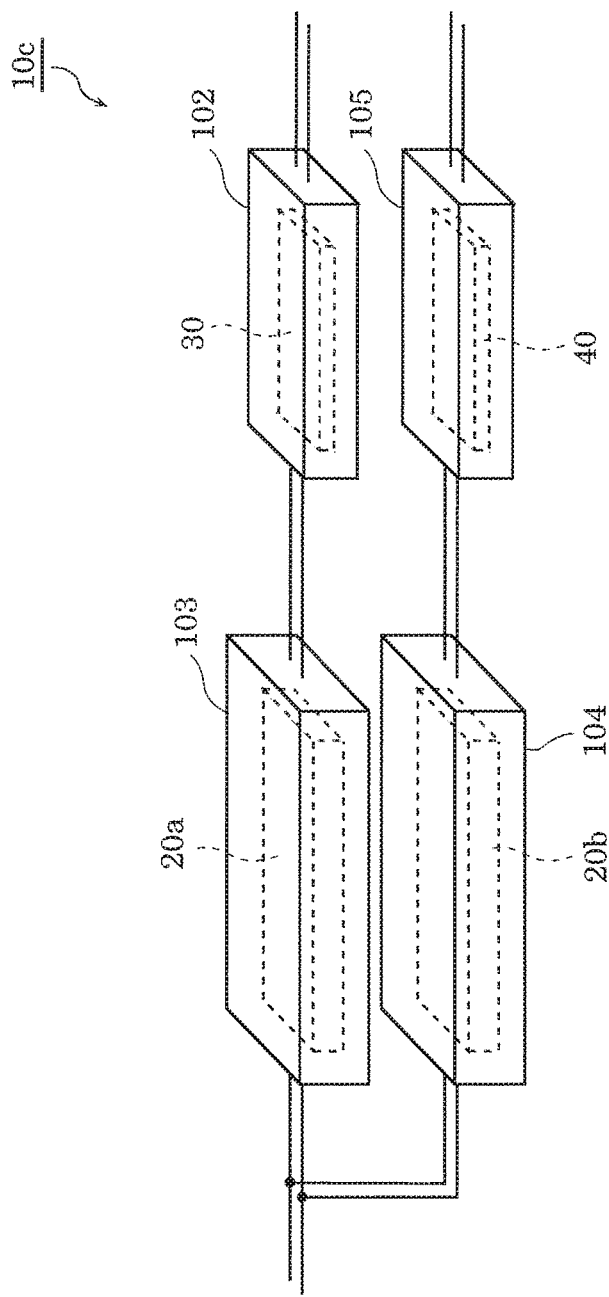
FIG. 15 is a diagram which illustrates an external appearance of the lighting device when the two constant current power supply circuit, the first modulation circuit, and the second modulation circuit are separately housed in different casings.

In the same manner as above, lighting device 10c may include a casing. Lighting device 10c may include a single casing which houses constant current power supply circuit 20a, constant current power supply circuit 20b, first modulation circuit 30, and second modulation circuit 40. Alternatively, constant current power supply circuit 20a, constant current power supply circuit 20b, first modulation circuit 30, and second modulation circuit 40 may be housed separately in different casings. FIG. 15 is a diagram which illustrates an external appearance of lighting device 10c when constant current power supply circuit 20a, constant current power supply circuit 20b, first modulation circuit 30, and second modulation circuit 40 are separately housed in different casings.

In the example of FIG. 15, lighting device 10c includes casing 103 which houses constant current power supply circuit 20a, casing 104 which houses constant current power supply circuit 20b, casing 102 which houses first modulation circuit 30, and casing 105 which houses second modulation circuit 40. Casing 102, casing 103, casing 104, and casing 105 are each formed using a metal material such as aluminum, for example. However, casing 102, casing 103, casing 104, and casing 105 may be each formed using a resin material such as a polybutylene terephthalate resin.

As described above, by separately housing constant current power supply circuit 20a, constant current power supply circuit 20b, first modulation circuit 30, and second modulation circuit 40 into different casings, it is possible to facilitate attaching and detaching of constant current power supply circuit 20a, constant current power supply circuit 20b, first modulation circuit 30, and second modulation circuit 40.

Embodiment 3

Figure 16:
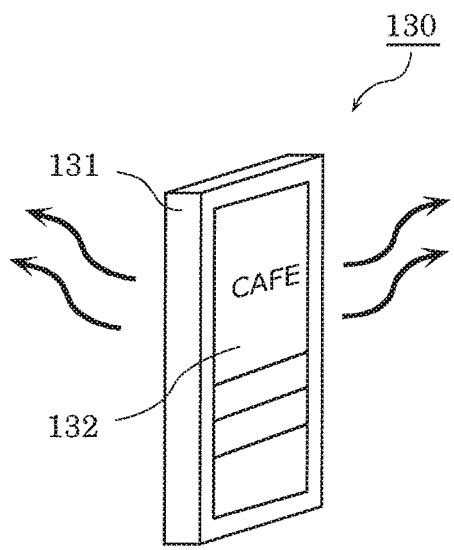
FIG. 16 is a diagram which illustrates an external appearance of a signboard according to Embodiment 3.

Illuminating apparatus 100, illuminating apparatus 100a, and illuminating apparatus 100b each have been described as a room-lighting illuminating apparatus which illuminates an indoor space of a store or the like. Illuminating apparatus 100, illuminating apparatus 100a, and illuminating apparatus 100b may each be used as a light source of a signboard, and thereby illuminate a display panel. In addition, the present disclosure may be implemented as a signboard which includes illuminating apparatus 100, illuminating apparatus 100a, or illuminating apparatus 100b. FIG. 16 is a diagram which illustrates an external appearance of a signboard including illuminating apparatus 100.

Signboard 130 illustrated in FIG. 16 includes frame 131 and display panel 132. In addition, although not illustrated in the diagram, signboard 130 includes illuminating apparatus 100 in a casing formed by frame body 131 and display panel 132. Among the components of illuminating apparatus 100, lighting device 10 may be disposed outside the casing. It should be noted that signboard 130 may include illuminating apparatus 100a or illuminating apparatus 100b instead of illuminating apparatus 100.

Display panel 132 covers a region enclosed by frame body 131. Display panel 132 is light transmissive and includes at least one of a text character and a graphic.

First light emitter 70 and second light emitter 80 are disposed inside signboard 130 so as to emit light toward display panel 132. Accordingly, display panel 132 is illuminated by first light emitter 70 and second light emitter 80.

Since such signboard 130 includes illuminating apparatus 100, it is possible to inhibit occurrence of an error in reading a barcode.

It is possible for a user to read a data signal by, for example, capturing an image of display panel 132 by a mobile terminal including an imaging device, such as a smartphone.

Advantageous Effects, Etc.

As described above, illuminating apparatus 100 includes first light emitter 70, second light emitter 80 which emits light that includes more predefined color components than light emitted by first light emitter 70, and lighting device 10 which supplies current i1 modulated according to a visible light communication signal, to first light emitter 70. Lighting device 10 supplies (a) current i2, which is a constant current, to second light emitter 80, while first light emitter 70 is supplied with current i1. In addition, lighting device 10b included in illuminating apparatus 100b supplies, to second light emitter 80, (b) current i3 modulated in reserve phase relative to current i1. Current i1 is one example of a first current, and current i3 is one example of a second current. Examples of the predefined color components include a red component.

With this, although light emitted by illuminating apparatus 100 and illuminating apparatus 100b blinks according to a visible light communication signal on the whole, a modulation degree of light (i.e., a difference between brightness and darkness of light) decreases at a red wavelength band (i.e., a wavelength band around 650 nm). Accordingly, the barcode reader which reads brightness or darkness of reflection light in the red wavelength band is less influenced by a change in the intensity of light emitted by illuminating apparatus 100 and illuminating apparatus 100b. In other words, illuminating apparatus 100 and illuminating apparatus 100b are capable of inhibiting occurrence of an error in reading a barcode.

For example, in illuminating apparatus 100 and illuminating apparatus 100b, first light emitter 70 emits white light having a first color temperature, and second light emitter 80 emits white light having a second color temperature that is lower in color temperature than the first color temperature.

With this configuration, illuminating apparatus 100 supplies current i2 to second light emitter 80 which emits light having a color temperature lower than a color temperature of light emitted by first light emitter 70, thereby making it possible to inhibit occurrence of an error in reading a barcode. Illuminating apparatus 100b supplies current i3 to second light emitter 80, thereby making it possible to inhibit occurrence of an error in reading a barcode.

For example, in illuminating apparatus 100a, first light emitter 70a includes first light emitting element 71a which emits blue light and second light emitting element 72a which emits green light, and second light emitter 80a includes third light emitting element 81a which emits red light. Lighting device 10 supplies current i2, which is a constant current, to second light emitter 80, while first light emitter 70a is supplied with current i1.

With this configuration, illuminating apparatus 100a supplies current i2, which is a constant current, to third light emitting element 81a which emits red light, thereby making it possible to inhibit occurrence of an error in reading a barcode.

For example, lighting device 10 includes first modulation circuit 30 and constant current power supply circuit 20 which supplies a constant current to first modulation circuit 30 and second light emitter 80. First modulation circuit 30 includes first capacitor 50 connected in parallel to first modulation circuit 30. First modulation circuit 30 supplies, to first light emitter 70, current i1 that is obtained by modulating current supplied from constant current power supply circuit 20, according to a visible light communication signal.

With this configuration, lighting device 10 is capable of supplying modulated current i1 to first light emitter 70 and constant current i2 to second light emitter 80 by a single constant current power supply circuit 20.

For example, lighting device 10b includes: constant current power supply circuit 20; and first modulation circuit 30 and second modulation circuit 40 which are connected in series between output terminal 22a and output terminal 22b of constant current power supply circuit 20. First modulation circuit 30 includes first capacitor 50 connected in parallel to first modulation circuit 30. Second modulation circuit 40 includes second capacitor 60 connected in parallel to second modulation circuit 40. First modulation circuit 30 supplies, to first light emitter 70, current i1 that is obtained by modulating current supplied from constant current power supply circuit 20 or first capacitor 50, according to a visible light communication signal. Second modulation circuit 40 supplies, to second light emitter 80, current i3 that is obtained by modulating current supplied from constant current power supply circuit 20 or second capacitor 60, in reverse phase relative to current i1.

With this configuration, lighting device 10b is capable of supplying current on which different modulation has been performed, separately to first light emitter 70 and second light emitter 80, by a single constant current power supply circuit 20.

For example, first light emitter 70 blinks while current i1 is supplied, and second light emitter 80 continues to emit light while first light emitter 70 is supplied with current i1.

With this configuration, illuminating apparatus 100, etc. cause first light emitter 70 to blink and second light emitter 80 to continue to emit light, thereby making it possible to inhibit occurrence of an error in reading a barcode.

In addition, signboard 130 includes illuminating apparatus 100, and display panel 132 that is illuminated by illuminating apparatus 100 and includes at least one of a text character and a graphic.

Since such signboard 130 includes illuminating apparatus 100, it is possible to inhibit occurrence of an error in reading a barcode.

Other Embodiments

Although the embodiments have been described thus far, the present disclosure is not limited to the embodiments.

For example, although it has been described that the first light emitter blinks according to a first visible light communication signal according to the foregoing embodiment, the first light emitter need not necessarily blink. The first light emitter may change in emission intensity according to the first visible light communication signal. In other words, the first light emitter may repeat switching between a state of emitting bright light and a state of emitting dark light, instead of repeating turning on and off.

In addition, the circuit configuration described in each of the above-described embodiments is one example, and the present disclosure is not limited to the above-described circuit configurations. In other words, as with the above-described circuit configurations, the present disclosure includes circuits capable of implementing the characteristic functions of the present disclosure. For example, within the scope that the same functions as the above-described circuit configurations can be implemented, the present disclosure also includes a circuit in which a switching element (transistor), a resistive element, or a capacitive element is connected in series or parallel to a given element.

Figure 17:
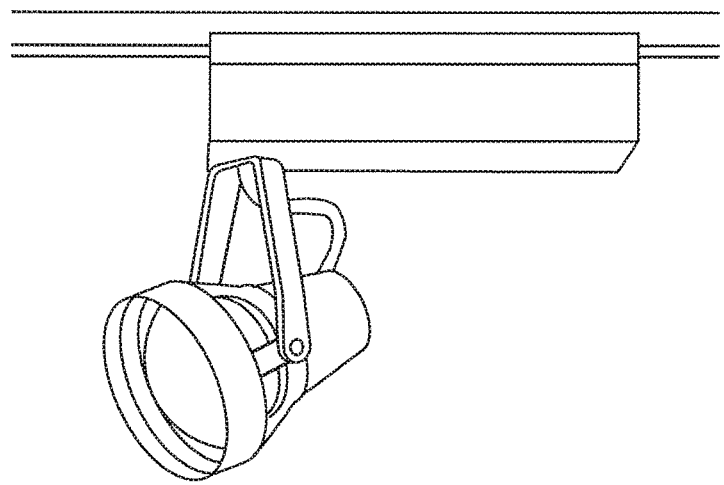
FIG. 17 is a diagram which illustrates an example of a specific aspect of the illuminating apparatus according to Embodiment 1 to Embodiment 3.

In addition, the illuminating apparatus for illuminating a space described in each of the above embodiments is, for example, implemented as a spotlight as illustrated in FIG. 17, but a specific aspect of the illuminating apparatus is not specifically limited. For example, the illuminating apparatus may be a chandelier, a ceiling light, a stand light, a Japanese-style light, a bracket light, a pendant light, a base light, a downlight, an exterior light, etc.

In addition, although a barcode reader which emits a red laser beam is used in the above-described embodiments, the barcode reader is not limited to this example, and any barcode reader which emits a laser beam of a color other than red may be used, in order to prevent generation of noise. More specifically, the predefined color components are not limited to the red components, and may be green components, etc., for example.

Other forms in which various modifications apparent to those skilled in the art are applied to the embodiments, or forms structured by combining structural components of different aspects of the embodiments may be included within the scope of the one or plural aspects, unless such changes and modifications depart from the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illuminating apparatus, comprising:
a first light emitter;
a second light emitter which emits light including more red components than light emitted by the first light emitter; and
a lighting device including a control circuit that obtains a visible light communication signal that causes light emitted by the illuminating apparatus to blink at a rate that is unrecognizable to human eyes and a bright and dark pattern created by the blinking light is a data transmission signal, the control circuit controls a first current supplied to the first light emitter by modulating the first current according to the visible light communication signal, the control circuit controls a second current supplied to the second light emitter by modulating the second current according to the visible light communication signal in reverse phase relative to the first current,
the lighting device supplies, to the second light emitter, the second current modulated in reverse phase relative to the first current, while the first current is supplied to the first light emitter.

2. The illuminating apparatus according to claim 1, wherein
the first light emitter emits white light having a first color temperature, and
the second light emitter emits white light having a second color temperature lower than the first color temperature.

3. The illuminating apparatus according to claim 1, wherein
the first light emitter includes a first light emitting element which emits blue light and a second light emitting element which emits green light,
the second light emitter includes a third light emitting element which emits red light, and
the lighting device supplies a constant current to the second light emitter while the first current is supplied to the first light emitter.

4. The illuminating apparatus according to claim 1, wherein
the lighting device includes:
a constant current power supply circuit; and
a first modulation circuit and a second modulation circuit which are connected in series between output terminals of the constant current power supply circuit, wherein
the first modulation circuit includes a first capacitor connected in parallel to the first modulation circuit,
the second modulation circuit includes a second capacitor connected in parallel to the second modulation circuit,
the first modulation circuit supplies the first current to the first light emitter, the first current being obtained by modulating, according to the visible light communication signal, current supplied from one of the constant current power supply circuit and the first capacitor, and
the second modulation circuit supplies the second current to the second 10 light emitter, the second current being obtained by modulating, in reverse phase relative to the first current, current supplied from one of the constant current power supply circuit and the second capacitor.

5. The illuminating apparatus according to claim 4, further comprising:
    a casing which houses the constant current power supply circuit, the first modulation circuit, and the second modulation circuit.

6. The illuminating apparatus according to claim 4, further comprising:
    a first casing which houses the constant current power supply circuit;
    a second casing which houses the first modulation circuit and is different from the first casing; and
    a third casing which houses the second modulation circuit and is different from the first casing and the second casing.

7. The illuminating apparatus according to claim 1, wherein
    the first light emitter blinks while the first current is supplied to the first light emitter, and
    the second light emitter continues to emit light while the first current is supplied to the first light emitter.

8. A signboard, comprising:
    the illuminating apparatus according to claim 1, and
    a display panel that is illuminated by the illuminating apparatus and includes at least one of a text character and a graphic.

* * * * *